(12) United States Patent
Go et al.

(10) Patent No.: US 11,759,859 B2
(45) Date of Patent: Sep. 19, 2023

(54) TECHNIQUES FOR DEPOWDERING ADDITIVELY FABRICATED PARTS THROUGH FLUID IMMERSION AND RELATED SYSTEMS AND METHODS

(71) Applicant: Desktop Metal, Inc., Burlington, MA (US)

(72) Inventors: Jamison Go, Orlando, FL (US); Daniel Sachs, Sunnyvale, CA (US); Robert J. Nick, Pepperell, MA (US); Jonah Samuel Myerberg, Lexington, MA (US); Michael Goldblatt, Lincoln, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/999,210

(22) Filed: Aug. 21, 2020

(65) Prior Publication Data
US 2021/0060651 A1    Mar. 4, 2021

Related U.S. Application Data

(60) Provisional application No. 62/890,921, filed on Aug. 23, 2019.

(51) Int. Cl.
*B22F 3/24* (2006.01)
*B33Y 40/20* (2020.01)
(Continued)

(52) U.S. Cl.
CPC ............... *B22F 3/24* (2013.01); *B08B 3/045* (2013.01); *B08B 3/102* (2013.01); *B08B 3/12* (2013.01);
(Continued)

(58) Field of Classification Search
None
See application file for complete search history.

(56) References Cited

U.S. PATENT DOCUMENTS

| 4,788,992 A | * | 12/1988 | Swainbank | ............. B08B 3/123 |
| | | | | 134/1 |
| 6,624,133 B1 | * | 9/2003 | McKenzie | ................ B08B 3/12 |
| | | | | 510/393 |

(Continued)

OTHER PUBLICATIONS

PCT/US2018/027611, Aug. 29, 2018, International Search Report and Written Opinion.

(Continued)

*Primary Examiner* — Eric W Golightly
(74) *Attorney, Agent, or Firm* — Wolf, Greenfield & Sacks, P.C.

(57) ABSTRACT

Techniques for depowdering in additive fabrication are provided. According to some aspects, techniques are provided that separate powder from additively fabricated parts through liquid immersion of the parts. Motion of the liquid, such as liquid currents, may dislodge or otherwise move powder away from additively fabricated parts to which it is adhered or otherwise proximate to. The liquid may also provide a vehicle to carry away powder from the additively fabricated parts. Removed powder may be filtered or otherwise separated from the liquid to allow recirculation of the liquid to the parts and/or to enable re-use of the powder in subsequent additive fabrication processes. Techniques for depowdering through liquid immersion may be automated, thereby mitigating challenges associated with manual depowdering operations.

6 Claims, 14 Drawing Sheets

(51) Int. Cl.
*B08B 3/10* (2006.01)
*B08B 3/04* (2006.01)
*B08B 3/12* (2006.01)
*B08B 3/14* (2006.01)
*B22F 10/00* (2021.01)

(52) U.S. Cl.
CPC ............... *B08B 3/14* (2013.01); *B22F 10/00* (2021.01); *B33Y 40/20* (2020.01); *B22F 2003/247* (2013.01)

(56) References Cited

U.S. PATENT DOCUMENTS

| | | | |
|---|---|---|---|
| 10,543,643 B2 | 1/2020 | Sachs et al. | |
| 2003/0062071 A1* | 4/2003 | Sorbo | A61L 2/025 134/109 |
| 2013/0026680 A1 | 1/2013 | Ederer et al. | |
| 2013/0081657 A1 | 4/2013 | Hewitt | |
| 2013/0244040 A1 | 9/2013 | Oshima | |
| 2016/0074911 A1 | 3/2016 | Dore | |
| 2016/0271652 A1 | 9/2016 | Fukumoto et al. | |
| 2016/0368224 A1 | 12/2016 | Ooba et al. | |
| 2017/0071707 A1 | 3/2017 | Uckelmann et al. | |
| 2018/0078975 A1 | 3/2018 | Bhoyar et al. | |
| 2018/0117219 A1 | 5/2018 | Yang et al. | |
| 2018/0161829 A1 | 6/2018 | Horie et al. | |
| 2018/0281295 A1 | 10/2018 | Tibbets et al. | |
| 2019/0184432 A1 | 6/2019 | Dore | |
| 2019/0344505 A1 | 11/2019 | Sachs et al. | |

OTHER PUBLICATIONS

PCT/US2018/027611, Oct. 24, 2019, International Preliminary Report on Patentability.

International Search Report and Written Opinion dated Aug. 29, 2018 in connection with International Application No. for PCT/US2018/027611, 16 pages.

International Preliminary Report on Patentability dated Oct. 24, 2019 in connection with International Application No. PCT/US2018/027611, 12 pages.

* cited by examiner

TECHNIQUES FOR DEPOWDERING ADDITIVELY FABRICATED PARTS THROUGH FLUID IMMERSION AND RELATED SYSTEMS AND METHODS

CROSS REFERENCE TO RELATED APPLICATIONS

The present application claims the benefit under 35 U.S.C. § 119(e) of U.S. Provisional Application No. 62/890,921, titled "Techniques For Depowdering Additively Fabricated Parts Through Fluid Immersion And Related Systems And Methods," filed Aug. 23, 2019, which is hereby incorporated by reference in its entirety.

BACKGROUND

Additive fabrication, e.g. 3-dimensional (3D) printing, provides techniques for fabricating objects, typically by causing portions of a building material to solidify at specific locations. Additive fabrication techniques may include techniques categorized as vat photopolymerization, powder bed fusion, binder jetting, material jetting, sheet lamination, material extrusion, directed energy deposition, or combinations thereof. Many additive fabrication techniques build parts by forming successive layers, which are typically cross-sections of the desired object. Typically each layer is formed such that it adheres to either a previously formed layer or a substrate upon which the part is built.

In some additive fabrication technologies, parts may be fabricated by combining portions of a powder or other granular material to create fully dense parts. For example, additive fabrication techniques known as binder jetting may selectively apply a liquid to portions of a layer of powder, then a subsequent layer of powder may be deposited over the first layer, and additional liquid applied to additional portions of the new layer, and so on. At the end of such a process, the parts are disposed within a volume of the powder from which the parts must be separated.

SUMMARY

According to some aspects, a method is provided of depowdering additively fabricated parts comprising bound metal powder and having unbound metal powder on their surface, the method comprising arranging one or more additively fabricated parts within a container containing a liquid, the container coupled to at least one inlet through which the liquid flows into the container, and the container coupled to at least one outlet through which the liquid flows out of the container, generating, using at least one source of agitation, currents within the liquid in the container, conveying, by the generated liquid currents, unbound metal powder away from the one or more additively fabricated parts, and filtering, using a filtration device coupled to the at least one outlet of the container, at least some of the conveyed unbound metal powder from the liquid that flows out of the container.

According to some aspects, a depowdering system is provided for removing powder from additively fabricated parts comprising bound metal powder and having unbound metal powder on their surface, the depowdering system comprising a container configured to hold liquid and having at least one inlet and at least one outlet, a holder configured to hold one or more additively fabricated parts within the container, a source of agitation configured to produce currents within the liquid held by the container and to thereby convey at least some of the unbound metal powder away from the one or more additively fabricated parts, a liquid pump coupled to the at least one inlet of the container and configured to move liquid into the container through the at least one inlet, and a filtration device coupled to the at least one outlet and configured to filter particles of metal power from liquid passing through the at least one filtration device.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
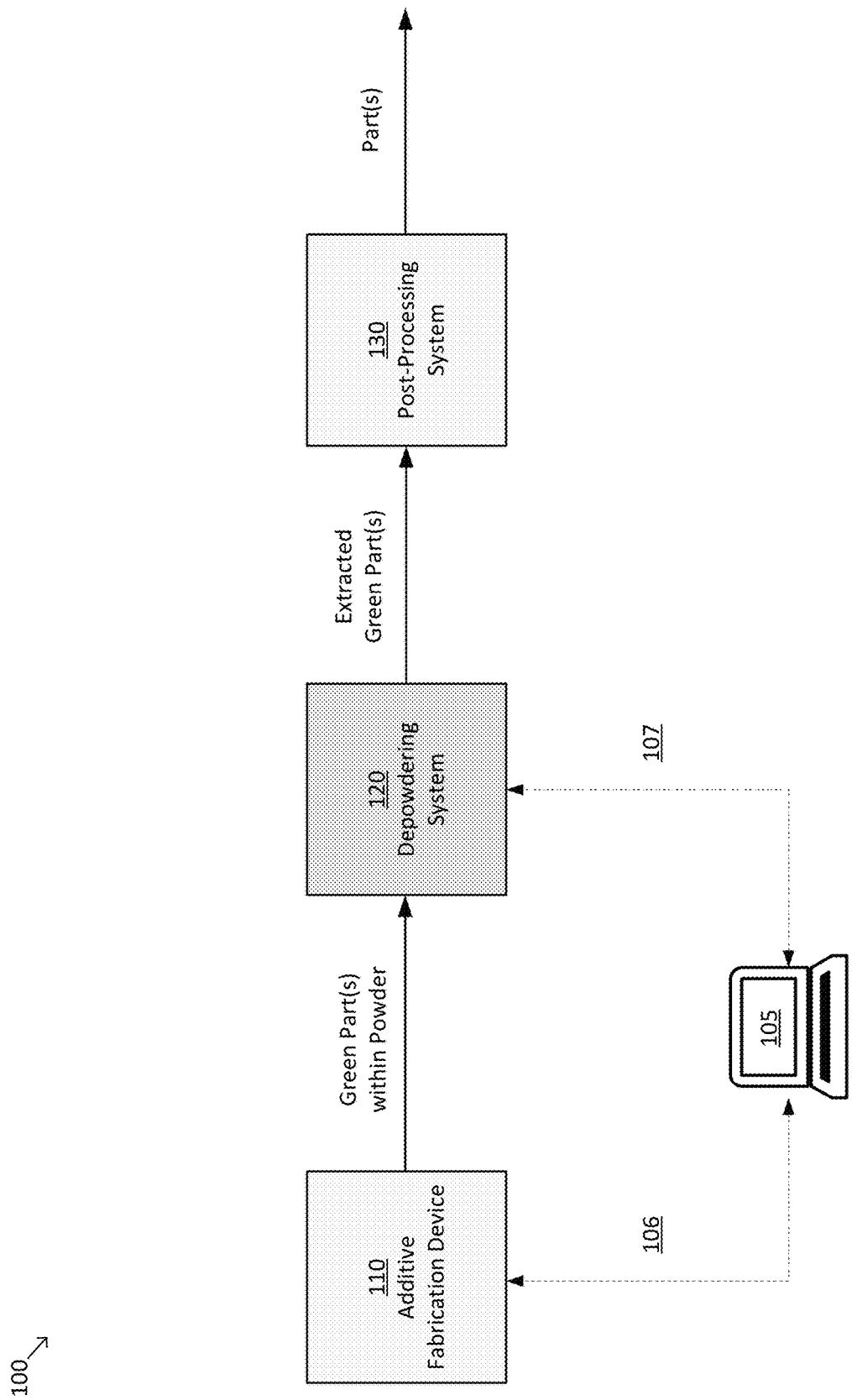
FIG. 1 is a block diagram of an additive fabrication system that includes a depowdering sub-system, according to some embodiments.

As discussed above, some additive manufacturing techniques fabricate parts from and within a granular material such as a powder. One example is binder jetting, in which parts are formed by applying a liquid (e.g., a binder) to regions of successive layers of powder, thereby producing parts (which are 'bound' regions of the powder) within a volume of unbound powder. Such parts are often referred to as "green" parts since they must undergo subsequent processing, such as sintering, to produce a final part. Other illustrative additive fabrication techniques that fabricate parts from a powder include direct laser melting, direct metal laser sintering, or selective laser sintering, in which regions of successive layers of a material (e.g., metal, nylon) are melted through application of directed energy.

Irrespective of how parts are formed from a powder or other granular material, subsequent to the additive fabrication process these parts are accessed by separating the parts from the material. This process of retrieving parts from a granular material in which the parts are formed is referred to herein as "depowdering," although it will be appreciated that techniques described herein are not limited to use cases in which the additional material comprises or consists of a powder. As such, while the discussion below may focus primarily on separating parts from a powder, it will be appreciated that any discussion of depowdering may also apply to separating additively fabricated parts from other granular materials.

Depowdering is frequently a laborious process due to the fine nature of the powder. Handling of the powder may cause a great deal of mess and, depending on the powder material, may also present safety concerns due to inhalation or flammability. Typically, depowdering is performed in a manual process of excavation that utilizes vacuum hoses and brushes to separate the parts from the powder. This process can take a great deal of time and in cases where the parts are fragile, can result in damage to the parts during excavation. Moreover, many powders used for additive fabrication, such as metal and/or ceramic powders, may exhibit low flowability which makes moving particles of the powder difficult due to the tendency of the powder to "clump" rather than flow away from the additively fabricated parts.

While, as discussed above, there are multiple additive fabrication technologies for which depowdering is performed, the process of depowdering may not be equally straightforward for each of these technologies. For instance, direct laser melting may produce metal parts during additive fabrication so that, prior to depowdering, the parts are embedded within a metal powder. Since the parts are solid metal, there is typically not a significant risk of damage to the parts during depowdering and so a wide range of simple techniques may be effective at separating the parts from the powder. In contrast, green parts produced in binder jetting comprise regions of bound powder held together by a liquid and may be considerably more fragile than parts produced by direct laser melting. Consequently, depowdering approaches that are effective for direct laser melting or selective laser sintering may not be suitable for parts produced through binder jetting since they may cause damage to the parts.

The inventors have recognized and appreciated techniques for depowdering that separate powder from parts through fluid immersion. According to the techniques described herein, the fluid may provide two benefits to depowdering. First, motion of the fluid, such as fluid currents, may dislodge or otherwise move powder away from parts to which it is adhered or otherwise proximate to. Second, the fluid may also provide a vehicle to carry away powder from the parts. In some cases, removed powder may be filtered or otherwise separated from the fluid to allow recirculation of the fluid to the parts and/or to enable re-use of the powder in subsequent additive fabrication processes.

The approaches described herein generally mobilize the powder and separate it from the parts by utilizing the fact that powder is lighter and more movable than the parts embedded within it. While some green parts, such as green parts produced by binder jetting, may be fragile with respect to scraping or impacts, such parts may nonetheless be resistant to damage from immersion in fluid or passing fluid over and/or around the parts. Many of the techniques described herein for depowdering through fluid immersion may be automated, as discussed further below, thereby mitigating the above-described challenges associated with manual depowdering operations.

According to some embodiments, depowdering via fluid immersion may be considered a "fine" depowdering operation in that the parts may have already been excavated from a bulk volume of powder, but some powder may nonetheless remain on the surface, and the fluid immersion techniques described herein may be suitable for removing some or all of the remaining powder. Generally, subsequent to excavation of such parts additional powder may still be adhered to the surface and additional depowdering may be necessary to produce a completely clean part. These two different types of depowdering are referred to herein as "coarse" and "fine" depowdering, wherein "coarse" depowdering broadly refers to excavating parts from powder and "fine" depowdering broadly refers to removing comparatively small amounts of powder from the surface of an excavated part. It will be appreciated that, the use of these terms notwithstanding, depowdering operations need not be rigidly categorized into purely coarse or purely fine depowdering operations. As such, these terms are used merely to aid description of the types of effects that may be produced by the techniques described herein, and should not be viewed as limiting.

According to some embodiments, techniques described herein for depowdering parts through fluid immersion may be performed by a depowdering system that is separate from an additive fabrication device that fabricated the parts. This approach may provide advantages for throughput, since it may allow for an additive fabrication device to begin fabricating a second group of parts while a first group of parts is being depowdered. Moreover, in use cases in which additive fabrication takes more or less time than the subsequent depowdering step, multiple additive fabrication devices and/or depowdering systems may be employed to minimize downtime of the additive fabrication device(s) and depowdering system(s). For instance, in a simple case where additive fabrication takes half as long as depowdering, two depowdering systems could be operated in parallel so that the additive fabrication device and the two depowdering systems could be operated continuously to maximize throughput.

According to some embodiments, a depowdering system as described herein may be configured to receive a build box from an additive fabrication device and to perform depowdering on contents of the build box. As referred to herein, a "build box" includes any structure in which parts may be fabricated from a powder by an additive fabrication device, and that may be removed from the additive fabrication device subsequent to fabrication. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering the subsection, metering another subsection, etc.

Irrespective of how a depowdering system may be configured to operate upon the contents of a build box, the depowdering system may be configured with a receptacle sized for the build box such that the build box can be removably mounted or otherwise removably attached to the depowdering system. Subsequent to depowdering, a build box may be removed from the depowdering system and reused for fabrication. At this stage in the process, the build box may, for instance, be empty or may contain only powder, depending on the particular type of depowdering operations performed as discussed below.

According to some embodiments, a depowdering system may comprise one or more sources of agitation configured to produce motion of fluid within a container. Additively fabricated parts may be placed within the fluid such that fluid currents produced by the source(s) of agitation may cause powder on the surface of the parts to be dislodged and carried away from the parts. Suitable sources of agitation may include one or more mechanical vibrators, which may be coupled to the container, to any other structure(s) coupled to the container, and/or to a structure in contact with the parts (e.g., a tray). Operation of the mechanical vibrators may produce oscillatory motion of the container, which may be transmitted to the fluid and in turn to the parts. Suitable sources of agitation may additionally or alternatively include jets configured to direct gas into the fluid and thereby create turbulence within the fluid. Suitable sources of agitation may additionally or alternatively include one or more heaters configured to heat the fluid and thereby induce convection currents within the fluid. Additional examples of suitable sources of agitation are discussed below.

According to some embodiments, a depowdering system may comprise one or more filtration devices coupled to the container holding the fluid and configured to separate powder present within the fluid from the fluid. For instance, a filtration device may be arranged outside of the container but coupled to an outlet of the container so that fluid flowing out of the container passes through the filtration device. As a result, powder separated from the parts within the fluid in the container may be directed out of the container and separated from the fluid. Such powder may in some cases be recycled and reused in subsequent additive fabrication processes, or may simply be discarded.

According to some embodiments, the container holding the fluid may have a shaped selected to aid in separation of the powder from the parts and/or to aid in removal of the powder from the container. For instance, powder within a container with a tapered bottom, such as a conical container, may be expected to collect at the bottom of the container. While fluid currents in the container may not necessarily be directed towards the bottom of the container, in at least some situations the aggregate effect of gravity and the fluid currents on particles of powder may be to direct the particles toward the bottom of the container. In some embodiments, the container may include an outlet at the bottom of the container so that particles of the powder directed to the bottom of the container may escape from the container through the outlet.

In some embodiments, a depowdering system may comprise a cavity configured to removably receive a build box. The depowdering system may comprise one or more actuators (or structures coupled to one or more actuators) that contact the build box when it is installed within the cavity. As a result, the depowdering system may be operated to vibrate at least part of the build box by operating the actuators.

Following below are more detailed descriptions of various concepts related to, and embodiments of, techniques for depowdering additively fabricated parts using fluid immersion. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of an additive fabrication system that includes a depowdering sub-system, according to some embodiments. System 100 includes an additive fabrication device 110, a depowdering system 120, a post-processing system 130 and computing device 105. System 100 may, for instance, represent the production pipeline for an additive fabrication technology in which parts are fabricated from a powder, examples of which may include binder jetting, direct metal laser sintering, direct laser melting or selective laser sintering. In general, any number of each of additive fabrication device 110, depowdering system 120 and post-processing system 130 may be included in such a pipeline, although a single instance of each will be discussed in relation to FIG. 1 for simplicity. As discussed above, a system that includes multiple devices at a given stage in the pipeline may provide for increased throughput by minimizing downtime of the devices in the pipeline.

In the example of FIG. 1, the additive fabrication device 110 may be configured to fabricate three-dimensional parts from one or more source materials. In particular, the additive fabrication device 110 may be configured to fabricate the parts from a powder or other granular source material. According to some embodiments, the source material may include a metal powder and/or a ceramic powder. Depending on the particular embodiment, a source material may for instance comprise a pure metal powder, a metal alloy powder, an intermetallic compound powder, one or more powder compounds containing at least one metallic element, and/or one or more ceramic powders. In some embodiments, the source material comprises pre-alloyed atomized metallic powders, a water or gas atomized powder, a mixture of a master alloy powder and an elemental powder, a mixture of elemental powders selected to form a desired microstructure upon the interaction of the elemental species (e.g., reaction and/or interdiffusion) during a post-processing step (e.g., sintering), one or more ceramic powders, and/or any other suitable materials. In some instances, the source material may comprise a sinterable powder, and/or the source material may be compatible with an infiltration process. Moreover, the source material may contain such wetting agents, flow improvers, coatings, and other powder modifications found to be useful in the sintering or infiltration of additively fabricated parts. Accordingly, it should be understood that the current disclosure is not limited to any particular material and/or combination of materials comprising the source material, nor is the current disclosure limited to any particular type of additive manufacturing process.

As one non-limiting example of a suitable additive fabrication device 110, the additive fabrication device may include a material deposition mechanism which be operated to deposit source material onto a powder, and a print head which may be controlled to move across the powder to deliver liquid such as a binder onto the powder. In some cases, an additional device such as a roller may be operated to move over the deposited source material to spread the source material evenly over the surface. The print head may include one or more orifices through which a liquid (e.g., a binder) can be delivered from the print head to each layer of the source material. In certain embodiments, the print head can include one or more piezoelectric elements, and each piezoelectric element may be associated with a respective orifice and, in use, each piezoelectric element can be selectively actuated such that displacement of the piezoelectric element can expel liquid from the respective orifice.

In this illustrative embodiment of the additive fabrication device 110, the print head may be controlled (e.g., by computing device 105) to deliver liquid such as a binder onto a powder in predetermined two-dimensional patterns, with each pattern corresponding to a respective layer of a three-dimensional part. In this manner, the delivery of the binder may perform a printing operation in which the source material in each respective layer of the three-dimensional part is selectively joined along the predetermined two-dimensional layers. After each layer of the part is formed as described above, the platform may be moved down and a new layer of powder deposited, binder again applied to the new powder, etc. until the part has been formed.

In the example of FIG. 1, parts produced by the additive fabrication device 110 may be referred to as "green" parts since they must undergo subsequent processing to produce a final part. Moreover, the parts produced by the additive fabrication device 110 may be contained within a volume of powder or other granular material, necessitating their extraction by the depowdering system 120. Various embodiments of the depowdering system (and/or elements of the depowdering system 120) are discussed further below.

Post-processing system 130 may include one or more devices suitable for transforming an extracted green part into a final part, which may include one or more debinding devices and/or furnaces. In systems employing a binder jetting process, extracted green parts can undergo one or more debinding processes in the post-processing system 130 to remove all or a portion of the binder system from the parts. As such, post-processing system 130 may include a thermal debinding device, a supercritical fluid debinding device, a catalytic debinding device, a solvent debinding device, or combinations thereof. In some embodiments, post-processing system 130 may include a furnace. Extracted green parts may undergo sintering in the furnace such that particles of the powder (or other granular material) combine with one another to form a finished part. In some embodiments, a furnace may be configured to perform one or more debinding processes within the furnace while extracted green parts undergo sintering.

According to some embodiments, the production of parts by system 100 may be partially or fully automated. In particular, the system may be configured to move parts embedded within powder from the additive fabrication device 110 to the depowdering system 120, and/or may be configured to move parts from the depowdering system 120 to the post-processing system 130. Automated motion may comprise one or more robotics system and/or conveyor belts, which may be configured to move parts (or parts embedded within powder) between devices in system 100, which may include motion between the three stages 110, 120 and 130 depicted in FIG. 1 and/or may be configured to move parts internally to one of the stages (e.g., moving parts between two depowdering devices of depowdering system 120). Automated motion may include automated removal of a build box from a device and/or insertion of a build box into a device. For instance, in some embodiments a build box may be automatically removed from the additive fabrication device 110 and automatically moved to, and inserted into, a component of depowdering system 120.

In some embodiments, the additive fabrication device 110 may fabricate parts within a build box, which may be automatically transferred from the additive fabrication device to the depowdering system 120. Depowdering system 120 may, as discussed above, be configured to receive a build box and to directly depowder parts within the build box while the parts are largely contained within the build box. In some embodiments, a depowdering system may be configured to receive a build box and to meter contents of the build box into or onto an apparatus within the depowdering system. In this case, the depowdering system may perform depowdering on successive subsections of the build box by metering a subsection, depowdering it, metering another subsection, etc.

According to some embodiments, automated movement as described above may be controlled by computing device 105. In the example of FIG. 1, computing device 105 is provided as an illustrative example of a suitable controller that may be configured to control various automated operations of the additive fabrication device 110 and/or depowdering system 120. However, it will be appreciated that system 100 may also be operated by multiple separate computing devices, including standalone computing devices and/or computing devices installed within the additive fabrication device 110, depowdering system 120 or post-processing system 130. Such computing devices may or may not be coupled to one another. As such, it will be appreciated that the below discussion of the various computational tasks that computing device 105 may be configured to perform need not be implemented using a single computing device as shown, but could be implemented on any number of different computing devices, which may be located within, or separate from, any of the elements of system 100. In particular, some computational tasks may be implemented by one such computing device but not another so that different computing devices may be configured to perform different functions from one another.

According to some embodiments, computing device 105 may be configured to generate two-dimensional layers that may each comprise sections of an object. Instructions may then be generated from this layer data to be provided to additive fabrication device 110 that, when executed by the device, fabricates the layers and thereby fabricates the object. Such instructions may be communicated via a communication link 106, which may comprise any suitable wired and/or wireless communications connection. In some embodiments, a single housing may hold the computing device 105 and additive fabrication device 110 such that the link 106 is an internal link connecting two modules within the housing of the device.

According to some embodiments, computing device 105 may be configured to receive, access, or otherwise obtain instructions generated to cause the additive fabrication device 110 to fabricate one or more parts, and may execute said instructions, thereby causing the additive fabrication device to fabricate the one or more parts. For instance, the instructions may control one or more motors of the additive fabrication device 110 to move components of the device to deposit powder, deposit liquid binder onto a layer of the powder, etc.

According to some embodiments, computing device 105 may be configured to generate instructions that, when executed by the depowdering system 120, automatically performs depowdering operations, examples of which are described below. Such instructions may be communicated via a communication link 107, which may comprise any suitable wired and/or wireless communications connection. In some embodiments, a single housing may hold the computing device 105 and depowdering system 120 such that the link 107 is an internal link connecting two modules within the housing of a device of the system.

In some embodiments, instructions to be executed by the depowdering system 120 may be generated based on the geometry of parts to be fabricated (or that were fabricated) by the additive fabrication device 120. As discussed further below, certain depowdering techniques may be based on, or may be improved by, removing powder from locations having a known relative location to parts within the powder. In some cases, instructions to be executed by the depowdering system 120 may be generated based on the locations of parts within the powder bed of the additive fabrication device 110 (or the expected locations after fabrication). As such, instructions to cause the additive fabrication device 110 to fabricate one or more parts may be generated by the computing device 105 as part of the same operation in which instructions are generated to be executed by the depowdering system 120. For example, computing device 105 may perform computational operations to arrange one or more parts to be fabricated within a three-dimensional volume representing the build volume of the additive fabrication device. The computing device 105 may then perform slicing of the parts in the volume and generate instructions for the additive fabrication device 110 to form successive layers of the parts, and in addition, may also generate instructions to be executed by the depowdering system based on the location and geometry of the parts within the volume.

As discussed above, a depowdering system may be perform depowdering on contents of a build box, either by directly depowdering parts within the build box while the parts are largely contained within the build box, or by metering contents of the build box into or onto an apparatus within the depowdering system. As examples of these two types of approaches, FIGS. 2A-2E depict illustrative operations that may be performed by a depowdering system to prepare the contents of a build box for depowdering operations, according to some embodiments.

In each of the examples of FIG. 2A-2E, some portion of a mixture of powder and parts is prepared for one or more depowdering operations. A mixture of powder and parts so prepared may be referred to herein as a "powder bed," irrespective of whether the mixture represents the entire contents of a build box or some subset of the contents of a build box, and irrespective of whether the mixture is held or supported by the build box or has been removed entirely from the build box. Accordingly, techniques described below as being applied to a powder bed may be understood as being applicable to any mixture of powder and parts, including but not limited to the various results of the operations of FIGS. 2A-2E.

Figure 2A:
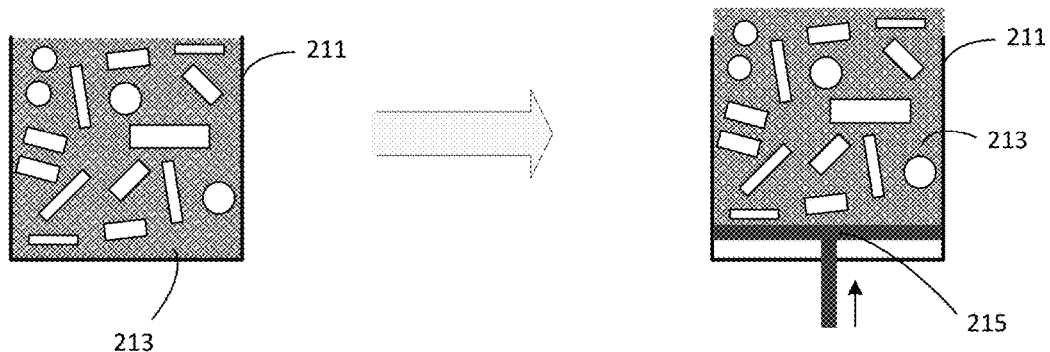
FIGS. 2A-2E depict illustrative operations that may be performed by a depowdering system to prepare the contents of a build box for depowdering, according to some embodiments.

In the example of FIG. 2A, a build box 211 initially comprises a mixture of powder and parts 213. Subsequently, a bottom surface of the build box is pushed upward by a delivery mechanism 215, which causes an upper section of the mixture of powder and parts 213 to be pushed beyond the upper edges of the build box. According to some embodiments, the build box 211 may comprise a plate arranged over the bottom of the build box onto which the powder and parts may be deposited. The delivery mechanism 215 may then engage with the plate and push it upwards within the build box. Alternatively, the bottom of the build box may be movable and the delivery mechanism 215 may engage with the bottom of the box and push it upwards.

Figure 2B:
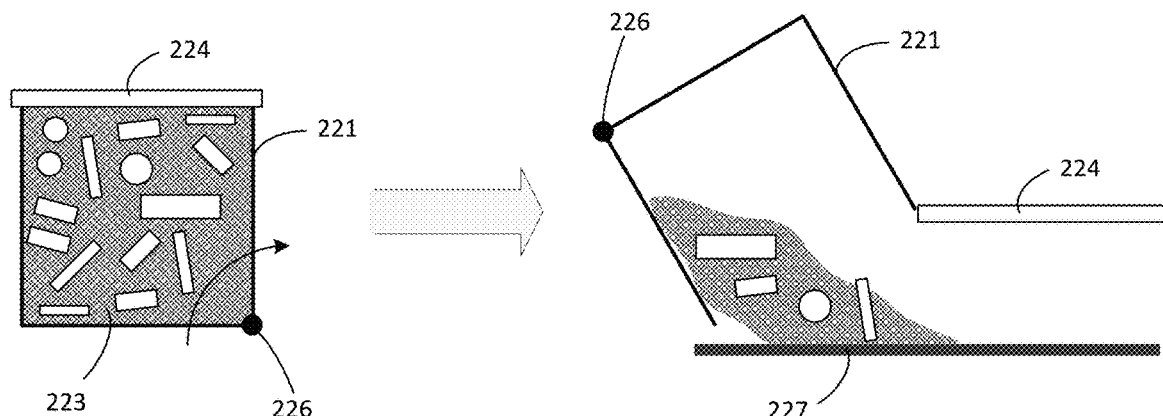

In the example of FIG. 2B, a build box 221 initially comprises a mixture of powder and parts 223 and has a cover 224 over the contents of the build box. Subsequently, the build box may be rotated around axis 226 and the lid may be automatically opened, thereby spilling contents of the build box 221 onto a desired surface 227.

Figure 2C:
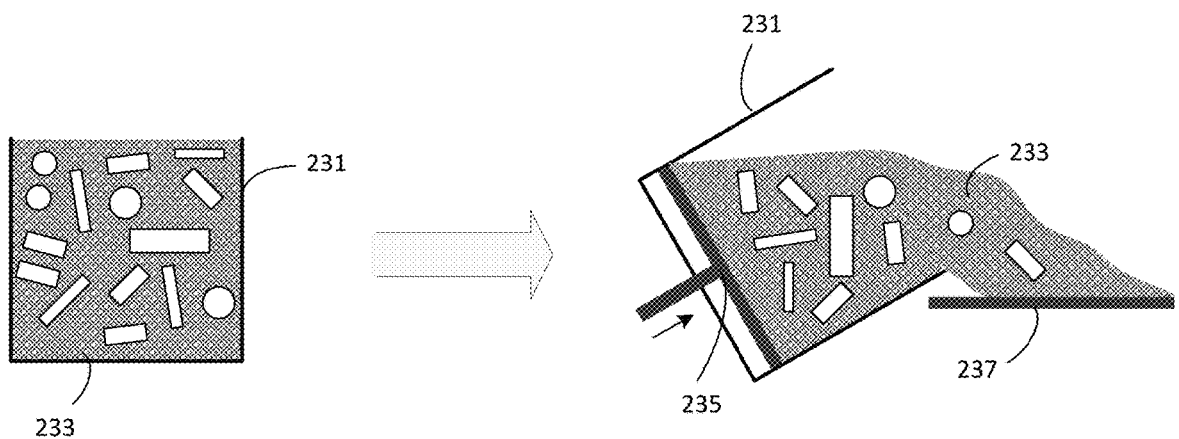

In the example of FIG. 2C, a build box 231 initially comprises a mixture of powder and parts 233. Subsequently, a bottom surface of the build box is pushed upward by a delivery mechanism 235, which causes an upper section of the mixture of powder and parts 233 to be pushed beyond the upper edges of the build box. Simultaneously, the build box is rotated, the combination of which cause contents of the build box to spill onto a desired surface 237. According to some embodiments, the build box 231 may comprise a plate arranged over the bottom of the build box onto which the powder and parts may be deposited. The delivery mechanism 235 may then engage with the plate and push it upwards within the build box. Alternatively, the bottom of the build box may be movable and the delivery mechanism 235 may engage with the bottom of the box and push it upwards.

Figure 2D:
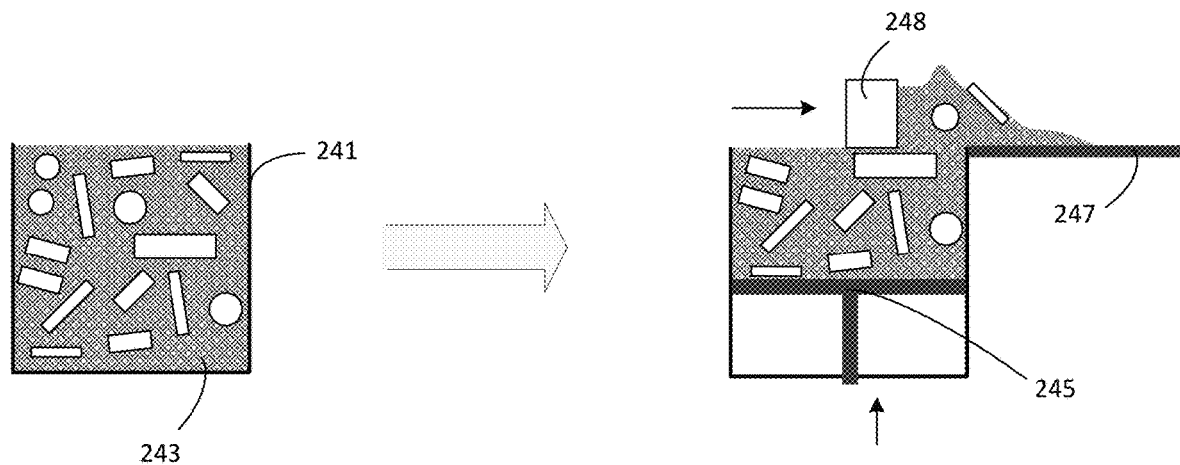

In the example of FIG. 2D, a build box 241 initially comprises a mixture of powder and parts 243. Subsequently, a bottom surface of the build box is pushed upward by a delivery mechanism 245, which causes an upper section of the mixture of powder and parts 243 to be exposed above the upper edges of the build box. Simultaneously or subsequently, a scraper 248 is moved over the surface of the build box, pushing the exposed powder and/or parts onto an adjacent surface 247. The scraper may for instance be wider than the box build and coupled to one or more actuators configured to move the scraper over the opening of the build box. According to some embodiments, the build box 241 may comprise a plate arranged over the bottom of the build box onto which the powder and parts may be deposited. The delivery mechanism 245 may then engage with the plate and push it upwards within the build box. Alternatively, the bottom of the build box may be movable and the delivery mechanism 245 may engage with the bottom of the box and push it upwards.

Figure 2E:
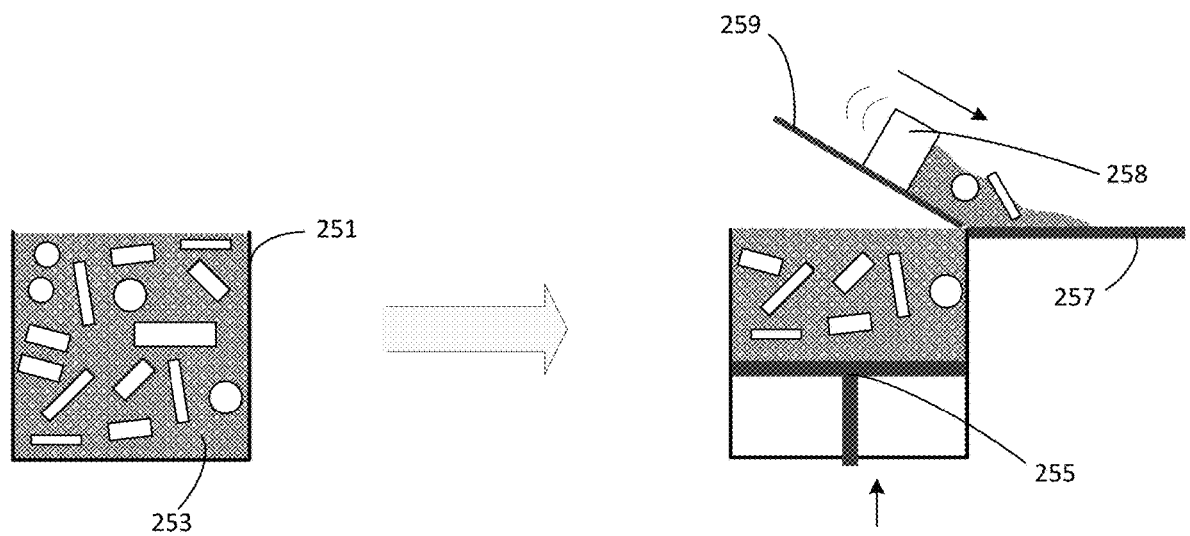

In the example of FIG. 2E, a build box 251 initially comprises a mixture of powder and parts 253. Subsequently, a bottom surface of the build box is pushed upward by a delivery mechanism 245, which causes an upper section of the mixture of powder and parts 243 to be exposed above the upper edges of the build box. Simultaneously or subsequently, a plate 259 is inserted into the exposed mixture of powder and parts and raised to incline the mixture on the plate 259. Simultaneously with insertion or inclination of the plate 259, or subsequently, scraper 258 is moved along the plate 259 to push the separated portion of the mixture 253 onto surface 257. In some cases, the plate 259 may be vibrated to aid the mixture of powder and parts to slide down the include onto surface 257. According to some embodiments, the build box 251 may comprise a plate arranged over the bottom of the build box onto which the powder and parts may be deposited. The delivery mechanism 255 may then engage with the plate and push it upwards within the build box. Alternatively, the bottom of the build box may be movable and the delivery mechanism 255 may engage with the bottom of the box and push it upwards.

In each of the examples of FIGS. 2A-2E, where components are described above as being moved, said motion may comprise, in each individual case, any combination of manual and/or automated motion. Automated motion may include execution of instructions by a suitable computing device to operate one or more components of the depowdering system 120, such as one or more actuators, to produce motion and/or may include motion produced by a user manually interacting with the depowdering system 120 (e.g., presses a button), which then automatically operates the one or more components of the depowdering system 120 to produce motion.

Figure 3A:
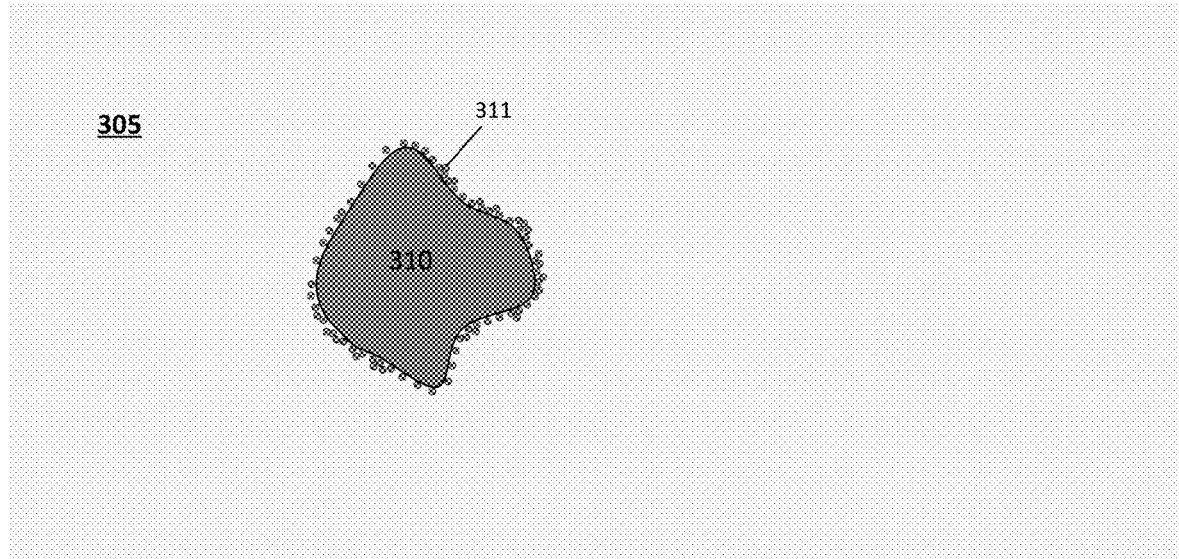
FIGS. 3A-3B are illustrations of an additively fabricated part immersed within a fluid, according to some embodiments.
Figure 3B:
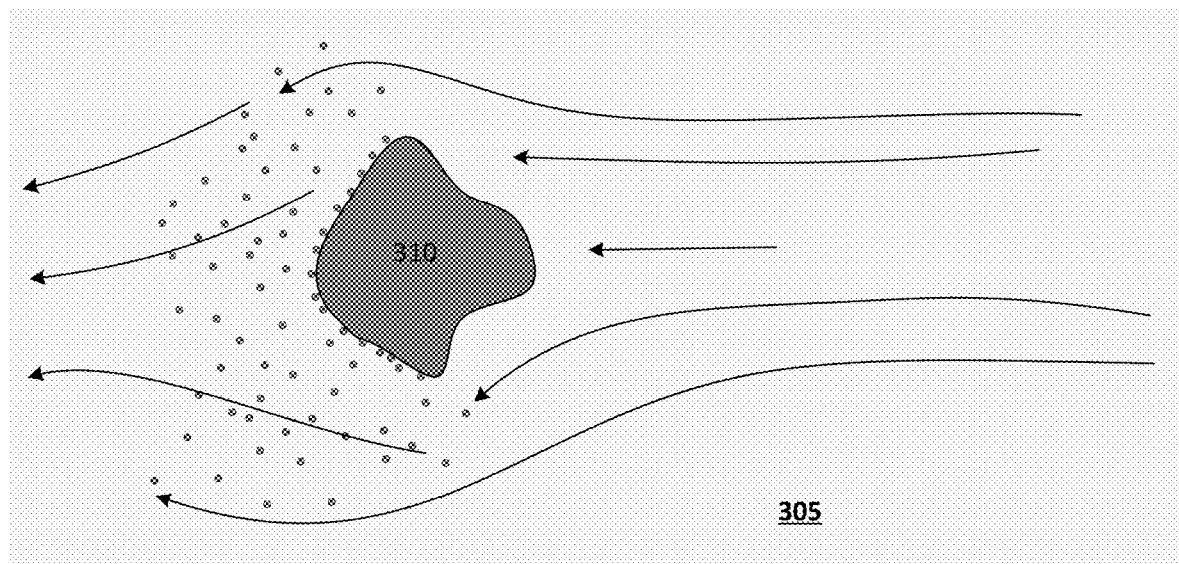

FIGS. 3A-3B are illustrations of an additively fabricated part immersed within a fluid, according to some embodiments. To illustrate the general principle of liquid immersion depowdering, a part 310 is depicted in FIG. 3A within a fluid 305. Particles of a powder 311 are present on the surface of the part 310. The particles of the powder may be adhered to the surface of the part 310, and/or may be adhered to other particles of the powder. As discussed above, many powders used for additive fabrication, such as metal and/or ceramic powders, may exhibit low flowability which makes moving particles of the powder difficult due to the tendency of the powder to "clump" rather than flow away from the additively fabricated parts. Similarly, such powders may resist separation from a part. According to some embodiments, the part 310 may comprise particles of the powder 311 held together, at least in part, by one or more binders.

Subsequent to the arrangement in FIG. 3A, fluid currents may be generated within the fluid via any suitable means, examples of which are discussed below. The fluid currents are depicted as arrows in FIG. 3B, and may pass around the part 310 and/or through internal channels or cavities within part 310, thereby causing at least some of the powder particles 311 to be removed from the surface of the part and to be carried by the fluid. As may be seen in the example of FIG. 3B, the particles may primarily be removed from surfaces of the part upon which fluid currents are incident. As such, faces of the part 310 that do not face the fluid current may retain some surface powder after application of the fluid currents to the part.

In some cases, fluid currents may be generated in various directions by a depowdering device so as to remove powder from multiple (and in some cases all) surfaces of the part. Additionally, or alternatively, a depowdering device may be configured to reorient the part within the fluid so that fluid currents can be directed to different surfaces of the part during depowdering.

Figure 4:
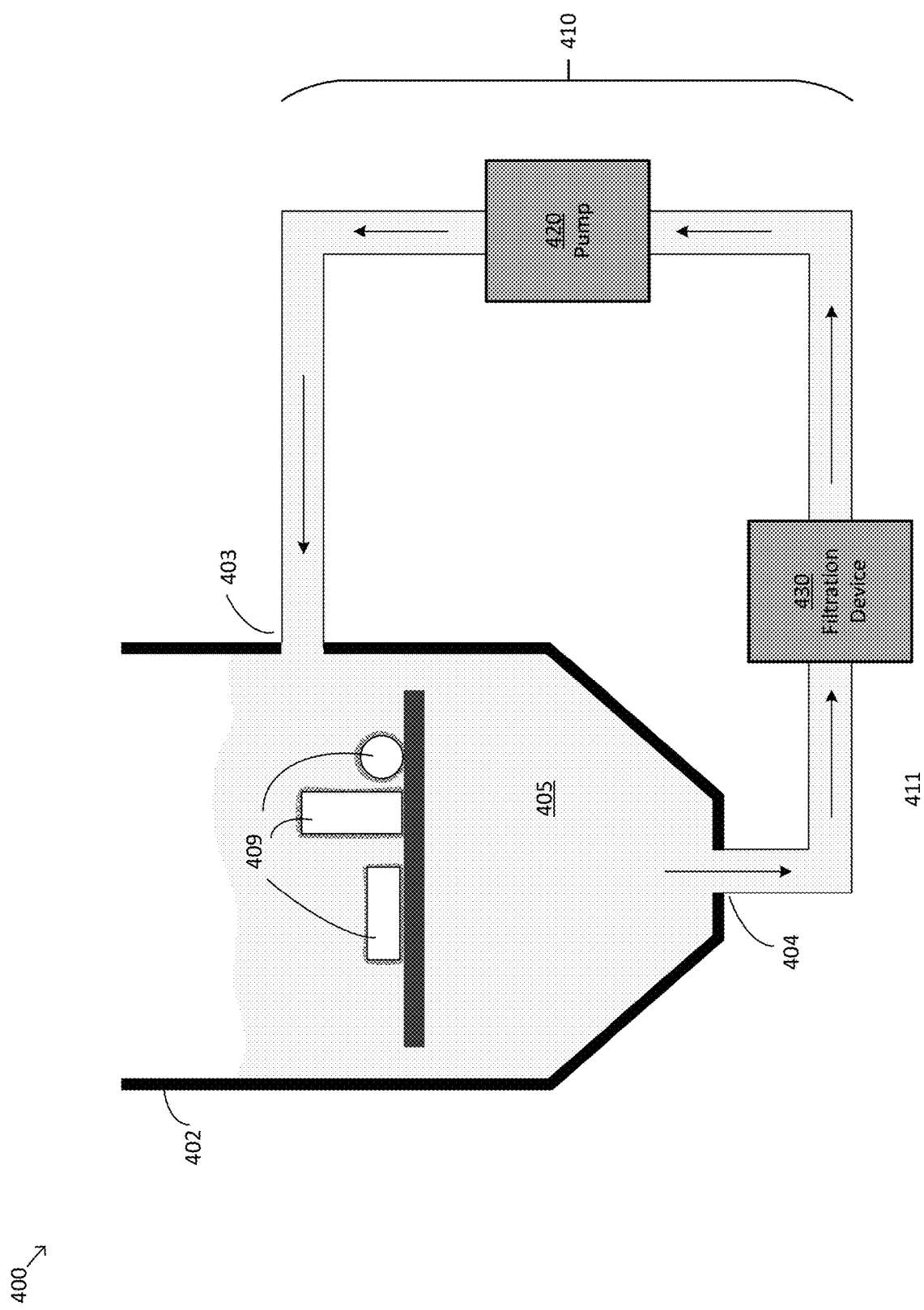
FIG. 4 depicts an illustrative depowdering system comprising a fluid immersion apparatus, according to some embodiments.

FIG. 4 depicts an illustrative depowdering system comprising a fluid immersion apparatus, according to some embodiments. Depowdering system 400 includes a container 402 configured to hold a fluid 405, and is configured to circulate the fluid through the container via a recirculation loop 410. In particular, pump 420 may be operated to pump fluid through the loop such that fluid is moved into the container through inlet 403, and such that fluid from the container passes through outlet 403 into vessel 411. Pump 420 may be the sole device in depowdering system 400 that produces fluid motion, or may be combined with one or more other pumps and/or other devices to cause fluid flow through the recirculation loop. Fluid may be moved into the container through inlet 403, for instance, as a result of increased fluid pressure produced at the output of pump 420. Similarly, fluid may be pulled through the outlet 403 into the recirculation loop as a result of decreased fluid pressure produced by the pump in the recirculation loop.

In the example of FIG. 4, a filtration device 430 is arranged within the recirculation loop and configured to filter powder present in the fluid passing into the filtration device, such that the fluid that passes to the pump 420 from the filtration device may comprise less powder than the fluid entering the filtration device (and in some cases may comprise no powder). A holder is arranged within the container 402 and is configured to hold additively fabricated parts (hereinafter "parts") 409. The depowdering system 400 may be configured to produce fluid currents within the fluid 405 within the container 402, such that powder on the surface of the parts 409 may be removed and may exit the container through the outlet 404. In some embodiments, such fluid currents may be generated by fluid motion produced by the pump 420. Additionally, or alternatively, however, additional sources of agitation may be arranged within system 400, examples of which are discussed below.

According to some embodiments, container 402 may be configured with a geometry for generating desired fluid currents within the container and/or to aid in removal of powder from the container. In the example of FIG. 4, for instance, the container 402 includes a tapered bottom section having sloping side walls that may cause powder within the fluid to move toward outlet 404 rather than settle on the bottom of the container as may be expected in the case of a horizontal bottom surface. In some cases, the container may have a cylindrical or conical shape, which may for instance aid in generating circular, helical and/or other gyratory currents within the fluid.

According to some embodiments, container 402 may be formed from a corrosion resistant material. For instance, if the fluid 405 comprises water, the container 402 may be formed from material that does not corrode in the presence of water. In some embodiments, the container 402 may comprise a metal, such as stainless steel, and/or may comprise a plastic. In some cases, the container 402 may be a stainless steel tank.

According to some embodiments, the fluid 405 may be a fluid that adheres well to unbound particles of the powder removed from the parts 409 and may be a fluid that has a higher inertia than air. According to some embodiments, the fluid 405 may comprise water, a solvent such as isopropyl alcohol and/or toluene, or combinations thereof. In some embodiments, the fluid 405 may comprise one or more surfactants, such as but not limited to Solsperse™ 40000, Disperbyk-2010, Surfynol®-2502, Tergitol™ NP10, Polyval 3-98, or combinations thereof in any suitable concentration(s). In some embodiments, the fluid 405 may be selected so as to be compatible with a sintering process to be performed on the parts 409 subsequent to depowdering by the depowdering system 400.

According to some embodiments, pump 420 may comprise any device suitable for producing motion of fluid through the recirculation loop 410. For instance, the pump 420 may comprise one or more positive displacement pumps (e.g., plunger and/or piston pumps), circumferential-piston pumps, diaphragm pumps, bellow pumps, gear pumps, lobed pumps, flexible-vane pumps, nutating pumps, peristaltic pumps, centrifugal pumps, volute pumps, diffuser pumps, propeller pumps, mixed-flow pumps, peripheral pumps, impellers, or combinations thereof. Pump 420 may also include any number of pump stages and/or suction intakes.

According to some embodiments, filtration device 430 may comprise any device suitable for separating particles of powder removed from parts 409 from the liquid 405 flowing through the filtration device. For instance, the filtration device 430 may comprise one or more sedimentation tanks, weirs, filters (e.g., carbon filter), cyclonics separators, or combinations thereof. Filtration device 430 may comprise any number of filtering stages. For instance, filtration device 430 may comprise a first stage comprising a sedimentation tank and weirs and a second stage comprising one or more filters.

According to some embodiments, holder 408 may comprise any structure suitable for holding parts 409 within the container 402 when the container comprises liquid 405. In some embodiments, it may be beneficial to minimize the surface area of the holder upon which powder removed from the parts may settle. For instance, on a holder that is a flat tray, powder may settle on the tray and build up over time in the absence of suitable fluid currents that would displace the powder from the tray. The tray may, for instance, have an upper surface that includes no portions that will be aligned horizontally when the tray is arranged within the container 402. For instance, the surface may have a continually curving surface, or a corrugated surface (e.g., a sawtooth and/or triangle wave-shaped surface). In some embodiments, holder 409 may include one or more edges (e.g., ridges arranged around the perimeter of the holder) configured to inhibit the parts 409 from falling from the sides of the holder into the container.

According to some embodiments, holder 408 may comprise one or more perforations large enough that powder removed from the parts 409 may pass through the perforations, and small enough that the parts 409 are unable to pass through the perforations. Such perforations may aid in moving powder that has been removed from the parts through the liquid to outlet 404, since the powder may more easily travel away from the holder 408 in the presence of the perforations. In some cases, perforations may be placed at positions of the holder in which powder may be expected to settle under gravity. For instance, a holder that includes a tray with a grooved surface, such as a corrugated surface, may include perforations within the grooves so that powder is preferentially drawn to the perforations under gravity.

According to some embodiments, holder 409 may comprise surface 227, 237, 247 or 257 as shown in FIGS. 2B-2E and discussed above. For instance, a mixture of powder and parts may be deposited onto a tray from a build box via any of the techniques described in relation to FIGS. 2B-2E, and the tray may be subsequently arranged within the container 402 as holder 408. Optionally, additional depowdering operations may be performed upon the mixture of powder and parts held by the holder between said deposition from the build box and arranging the holder in the container 402. For instance, one or more coarse depowdering operations based on gas flow and/or vibration may be performed upon the mixture of powder and parts held by the holder 408, and subsequently the holder may be arranged within the container 402 for additional (e.g., fine) depowdering. Examples of coarse depowdering operations based on gas flow and/or vibration are described in U.S. Patent Application No. 62/882,703, titled "Techniques for Depowdering Additively Fabricated Parts Via Gas Flow and Related Systems and Methods, filed Aug. 5, 2019, and in U.S. Patent Application No. 62/885,692, titled "Techniques for Depowdering Additively Fabricated Parts Through Vibratory Motion and Related Systems and Methods, filed Aug. 12, 2019, each of which is hereby incorporated by reference in its entirety.

According to some embodiments, holder 408 may comprise an enclosed structure such that parts 409 are at least partially enclosed by the structure. For instance, the holder 408 may comprise a cage within which the parts 409 are arranged. The cage walls may be configured with gaps that allow particles removed from the parts to pass through while retaining the parts within the cage. For instance, the holder 408 may comprise an enclosed structure formed from a fine mesh.

According to some embodiments, holder 408 may hold parts 409 via means other than gravity. In the example of FIG. 4, the parts 409 rest on the holder 408 due to gravity. However, the holder may be configured to additionally or alternatively hold the parts by means other than gravity. For instance, the holder may include one or more structures configured to apply force to sides of one or more parts to hold then in place in or on holder 408, such as a grabber or a flexible structure into which a portion of a part may be inserted and held. Such structures may be configured to hold parts on an upper surface of the holder (e.g., on the surface of a tray) or may be configured to hold parts beneath a portion of the holder (e.g., hanging the parts into the fluid 405). According to some embodiments, parts 409 may be reoriented within structures of the holder 408 during depowdering so that different portions of the surfaces of the parts may be subject to depowdering by the fluid 405.

According to some embodiments, holder 408 may be coupled to one or more mechanisms configured to move the holder 408 within the container 402. For instance, the mechanism(s) may be configured to raise and lower the holder 408 into and out of the container 402. Additionally, or alternatively, the mechanism(s) may be configured to rotate the holder within the container (e.g., tilting the holder).

According to some embodiments, depowdering system 400 may comprise one or more sources of agitation (not shown in FIG. 4). Each of the one or more sources of agitation may include one or more components configured to be operated by the depowdering system to produce fluid currents within the container 402. As described above, the motion of fluid in proximity to the parts 409 may cause particles of powder adhered to the parts to be separated from the parts. Numerous different devices may be configured to produce suitable fluid currents, examples of which are discussed below.

According to some embodiments, the one or more sources of agitation of depowdering system 400 may include one or more sources of vibration. For instance, one or more mechanical vibrators may be coupled to the container 402 which, when operated by the depowdering system, may produce fluid motion within the fluid 405 held by the container.

Suitable actuators for producing vibration, which may also be referred to herein as mechanical vibrators, may include, but are not limited to, eccentric rotating mass (ERM) vibration motors; linear resonant actuators (LRA) such as rectangular LRAs; coin vibration motors such as LRA, brushless, or double-magnet brush type motors; cylindrical vibration motors, spring contact vibration motors, thru-hole vibration motors, encapsulated vibration motors, air-powered vibrators (e.g., a linear actuator in which a piston is actuated by aid along an axis, a rotary actuator in which air pushes a ball around in a chamber), or combinations thereof. An actuator for producing vibration (or mechanical vibrator) may produce vibration through any suitable technique(s), including via piezoelectric and/or magnetic techniques. Motion of an actuator for producing vibration (or mechanical vibrator) may include linear, rotary, angular and/or orbital motion. Any techniques that relate to vibration described herein will be understood to encompass each of these techniques for producing vibration in any suitable combination, as the techniques are not limited to any particular technology for operating a depowdering system to produce vibration.

According to some embodiments, the one or more sources of agitation of depowdering system 400 may include one or more ultrasonic transducers. The ultrasonic transducer(s) may be arranged proximate to and/or in contact with the container 402 and operated to produce ultrasound waves which produce fluid motion within the fluid 405 held by the container. In some cases, ultrasound produced by an ultrasonic transducer may cause cavitation on the surface of parts 409 which may further aid in removing powder from the parts.

According to some embodiments, the one or more sources of agitation of depowdering system 400 may include one or more heaters. For instance, one or more heating elements, hot plates and/or other structures that may be operated by the depowdering system to have a temperature above ambient temperature may be thermally coupled to the container 402. Heaters may produce fluid motion within the fluid 405 held by container 402 by producing convection currents in the fluid.

According to some embodiments, the one or more sources of agitation of depowdering system 400 may include one or more stirrers. A stirrer may, for instance, include a mechanical whisk, a propeller, an impeller, and/or a stirring rod. The depowdering system 400 may operate the one or more stirrers to produce fluid motion within the fluid 405 held by container 402. Such stirrers may be located at any position within the container 402. In some embodiments, a stirrer may be operated through a coupling between the stirrer and a magnetic component, which is moved to produce motion of the stirrer. For example, a magnetic stirring rod may be arranged within container 402 (and may in some cases float within the container detached from other components) and operated by moving a magnetic component located outside of the container that is magnetically coupled to the stirring rod.

According to some embodiments, the one or more sources of agitation of depowdering system 400 may include the holder 408. In some cases, the depowdering system 400 may produce motion of the holder, which may in turn produce fluid motion within the fluid held by container 402. Such motion of the holder 408 may also remove powder as a result of relative motion between the parts 409 and fluid 405 being created through the movement of the holder. As one example, the holder 408 may be moved side-to-side or up and down within the container by the depowdering system.

According to some embodiments, the one or more sources of agitation of depowdering system 400 may include one or more fluid jets configured to jet a fluid into the container 402. The jetted fluid may be fluid 402, although may also be a different fluid. In some embodiments, the one or more fluid jets may include one or more air jets. Irrespective of the particular fluid(s) produced by the one or more fluid jets, turbulence may be generated within the fluid 405 held by container 402 through motion of jetted fluid(s). Gas bubbles, for instance, may collide with parts 409, causing powder to be dislodged from the surface of the parts.

According to some embodiments, the one or more sources of agitation of depowdering system 400 may include sources of fluid 405 arranged externally to the container 402 and that may be operated to deposit fluid into the container. For instance, pouring fluid 405 into the container 402 from above the container may produce turbulence within the fluid held by the container. In some cases, the holder 408 may be arranged so that some or all of the parts 409 are arranged outside of the fluid 405 held by the container 402. As such, additional fluid 405 being deposited into the container from above may be incident upon the parts prior to mixing with the fluid within the container, which may cause powder to be removed from the parts as a result of the collision between the poured fluid and the powder/parts.

In some embodiments, container 402 may comprise a lid. In embodiments in which fluid flow within the container may be sufficiently turbulent to cause fluid 405 to spill out of the container, the lid may be operated manually or automatically by the depowdering system to enclose the container 402 prior to depowdering.

Figure 5A:
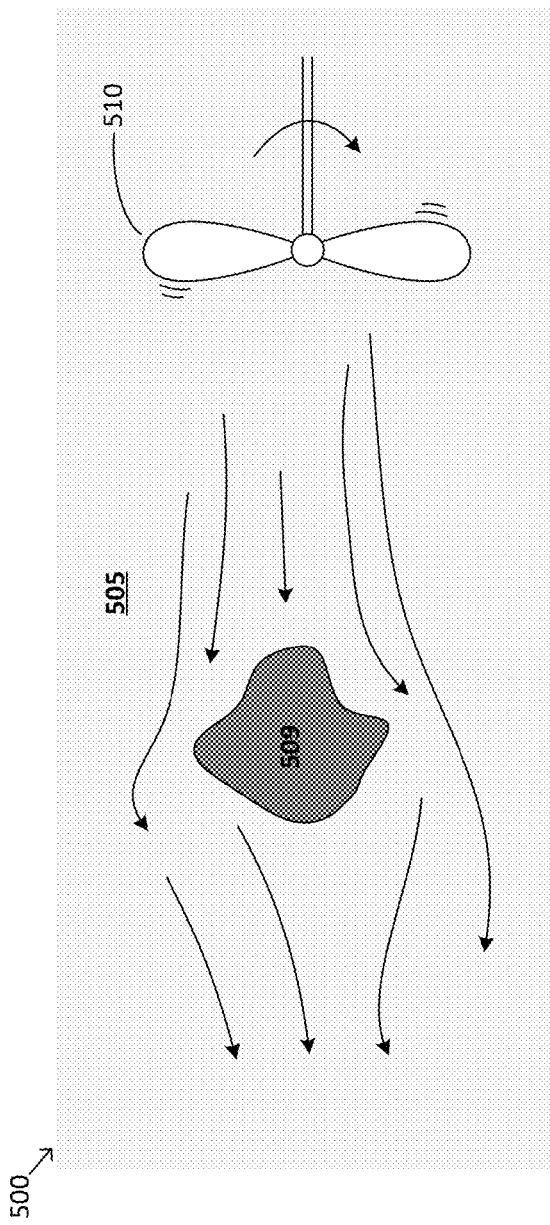
FIG. 5A depicts an example of producing fluid currents using a propeller, according to some embodiments.

FIG. 5A depicts an example of producing fluid currents using a propeller, according to some embodiments. In the example of FIG. 5A, depowdering system 500 includes a propeller 510 configured to be operated by the depowdering system to rotate and thereby produce fluid currents within fluid 505 as a result of rotational motion of the propeller blades. The propeller 510 may for instance be deployed as a source of agitation in depowdering system 400 shown in FIG. 4, whether by deployment on a side of the container 402 or on a bottom surface of the container 402. Part 509 is depicted for purposes of illustration, and in operation may be arranged on top of (or otherwise held by) a holder.

Figure 5B:
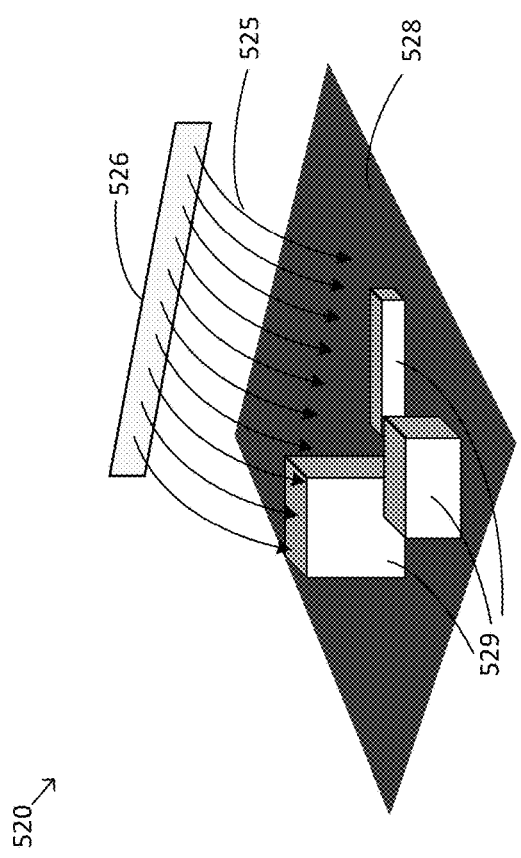
FIG. 5B depicts a portion of a depowdering system in which additively fabricated parts are immersed in a fluid waterfall, according to some embodiments.

FIG. 5B depicts a portion of a depowdering system in which additively fabricated parts are immersed in a fluid waterfall, according to some embodiments. In the example of FIG. 5B, depowdering system 520 comprises parts 529 arranged on a tray 528, onto which a fluid 525 is deposited from a fluid source 526. The tray 528 may be arranged outside of and above a container holding additional fluid. The fluid 525 may be poured and/or jetted from the source 526. In some embodiments, the tray 528 may comprise a plurality of perforations such that fluid incident upon the parts 529 may subsequently flow through, rather than only around, the tray 528.

Figure 6:
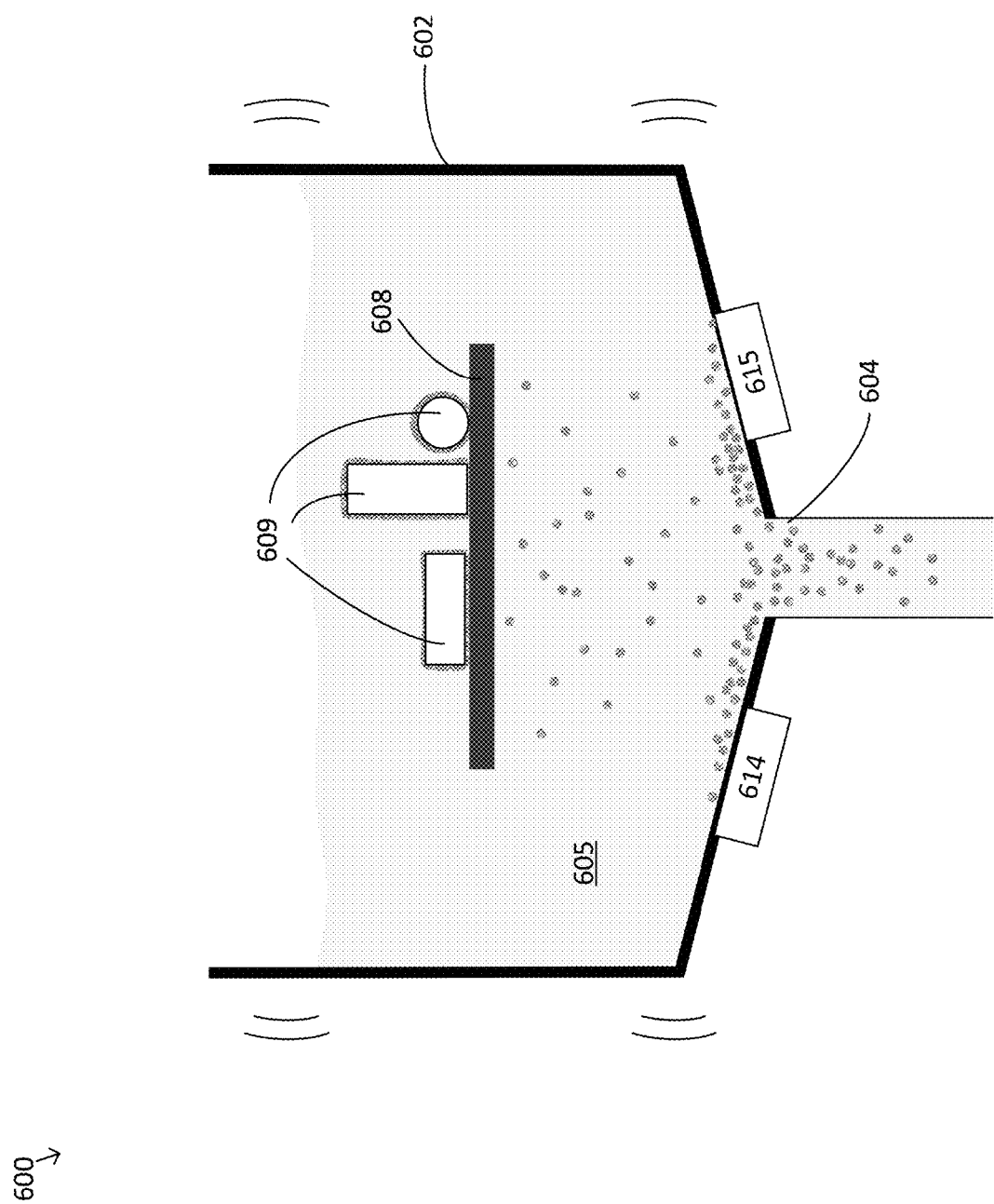
FIG. 6 depicts an illustrative depowdering system comprising vibratory devices coupled to a container, according to some embodiments.

FIG. 6 depicts an illustrative depowdering system comprising vibratory devices coupled to a container, according to some embodiments. Depowdering system 600 comprises a container 602 holding fluid 605 in which a tray 608 holding parts 609 is arranged. Mechanical vibrators 614 and 615 are coupled to the container 602 such that operation of the mechanical vibrators by the depowdering system may vibrate the container 602. In turn, said vibration of the container may produce fluid motion, which may in turn cause powder to be removed from the parts 609. Powder so removed may generally fall under gravity to the bottom of the container 602 and through outlet 604.

Figure 7:
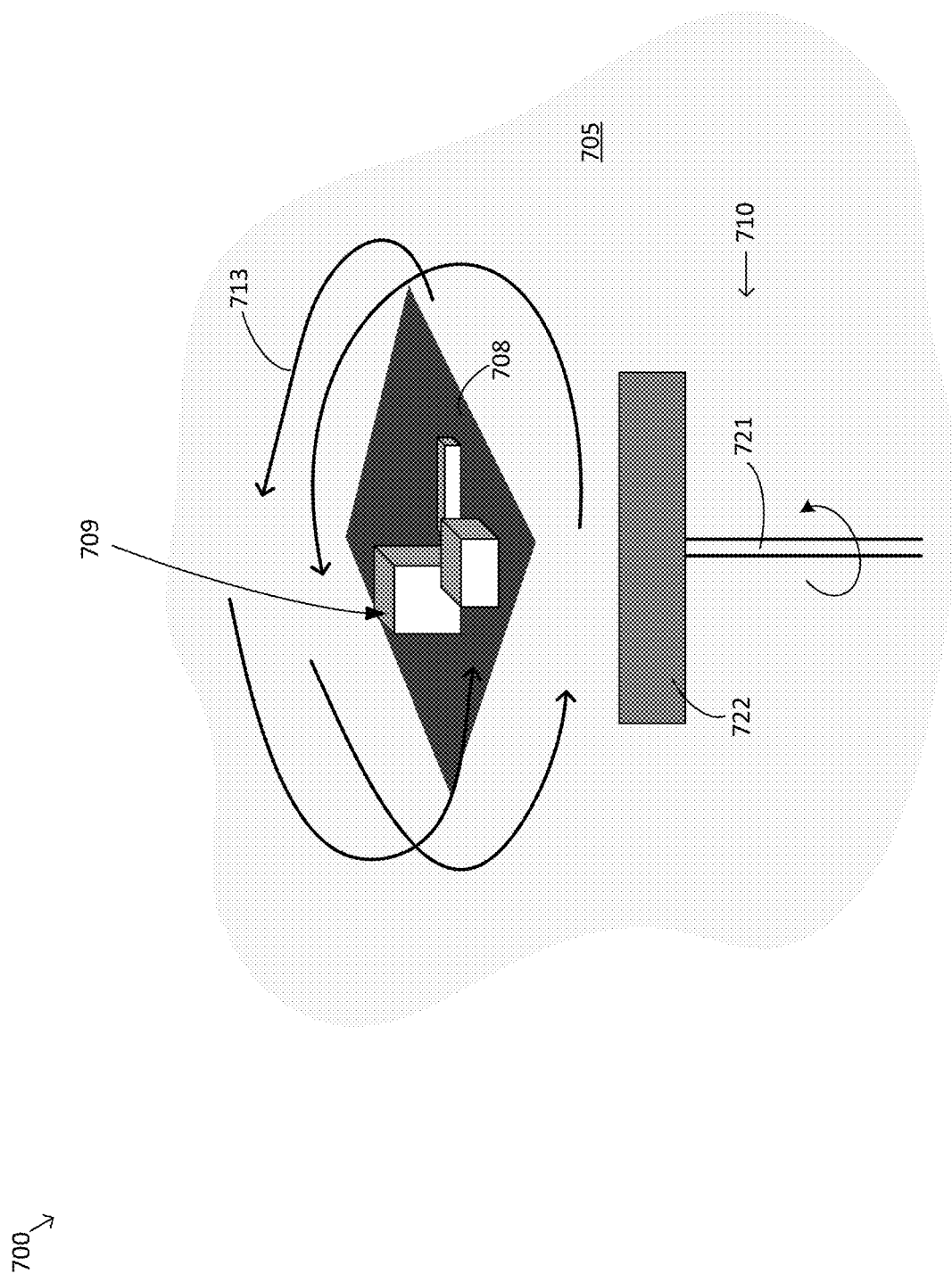
FIG. 7 illustrates fluid currents produced around additively fabricated parts as a result of a stirring action, according to some embodiments.

FIG. 7 illustrates fluid currents produced around additively fabricated parts as a result of a stirring action, according to some embodiments. Depowdering system 700 comprises a stirrer 720 that includes axle 721 and paddle 722 and is configured to be operable by the depowdering system to rotate within fluid 705 which is held by a container (not shown). Parts 709 are arranged on a holder 708 within the fluid 705. Rotation of the stirrer 720 around the long axis of axle 721 produces rotational motion of the paddle 722, which may produce fluid currents 713 within the fluid 705.

Figure 8:
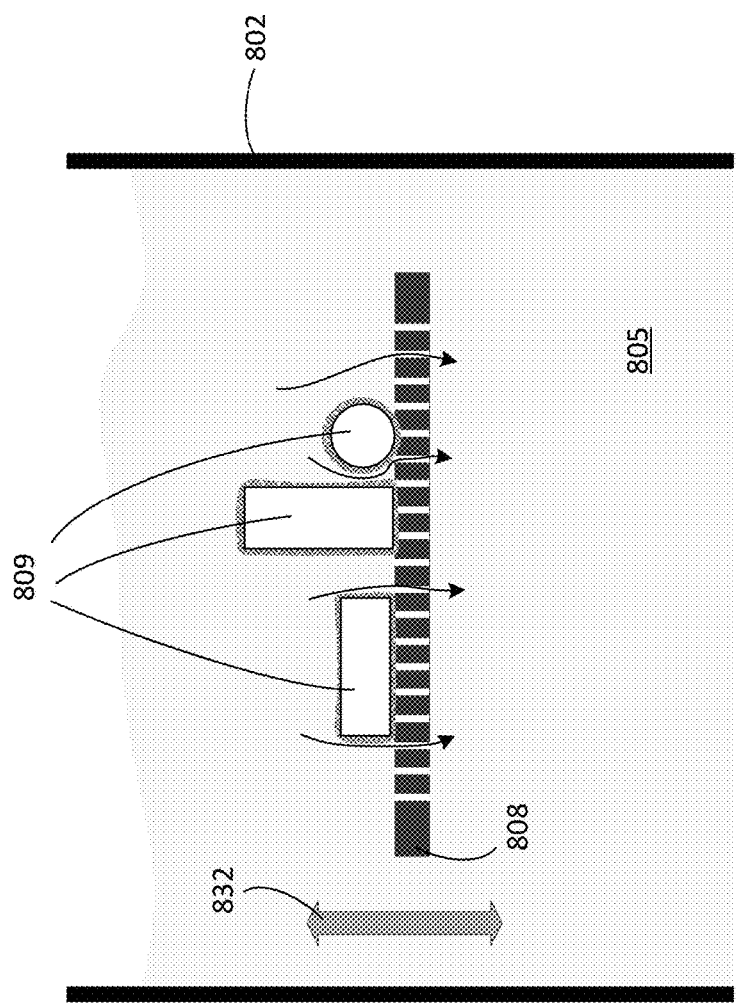
FIG. 8 illustrates fluid currents produced by cyclical motion of an additively fabricated part holder, according to some embodiments.

FIG. 8 illustrates fluid currents produced by cyclical motion of an additively fabricated part holder, according to some embodiments. Depowdering system 800 comprises a container 802 (only part of which is shown in FIG. 8), that holds a fluid 805. Holder 808 is arranged within the container and includes a plurality of perforations, which are shown in cross-section in FIG. 8. Holder 808 is configured to be operated by the depowdering system to move up and down along axis 832, which may cause powder adhered to parts 809 to separate from the parts and, in at least some cases, to flow through the perforations of the holder 808 as depicted by the several illustrative arrows shown in FIG. 8.

Figure 9:
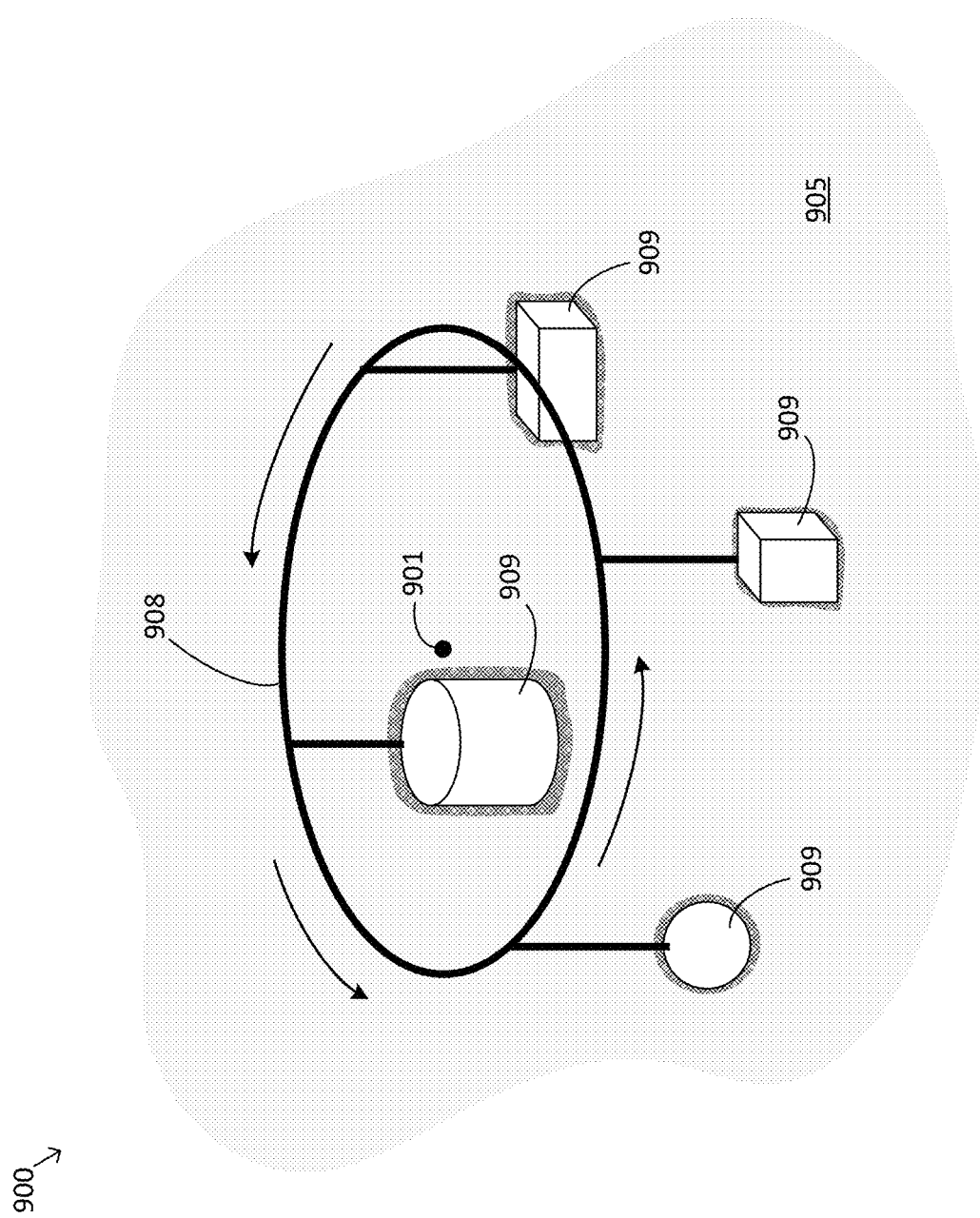
FIG. 9 illustrates motion of a holder configured to move parts within a fluid, according to some embodiments.

FIG. 9 illustrates motion of a holder configured to move parts within a fluid, according to some embodiments. Depowdering system 900 includes holder 908 which is configured to be operated by the depowdering system to rotate about axis 901. Parts 909 may be coupled to the holder 908 and may move through the fluid 905 as a result of the motion of the holder. In the example of FIG. 9, the parts are depicted as being attached to the holder 908; however, it will be appreciated that the holder 908 may also include additional structures not shown upon which the parts 909 may rest. For instance, holder 908 may comprise a cylinder with an attached bottom surface that partially (or fully) encloses the bottom open end of the cylinder. As a result, parts 909 may rest on the bottom surface while the holder is rotated within the fluid 905.

Figure 10:
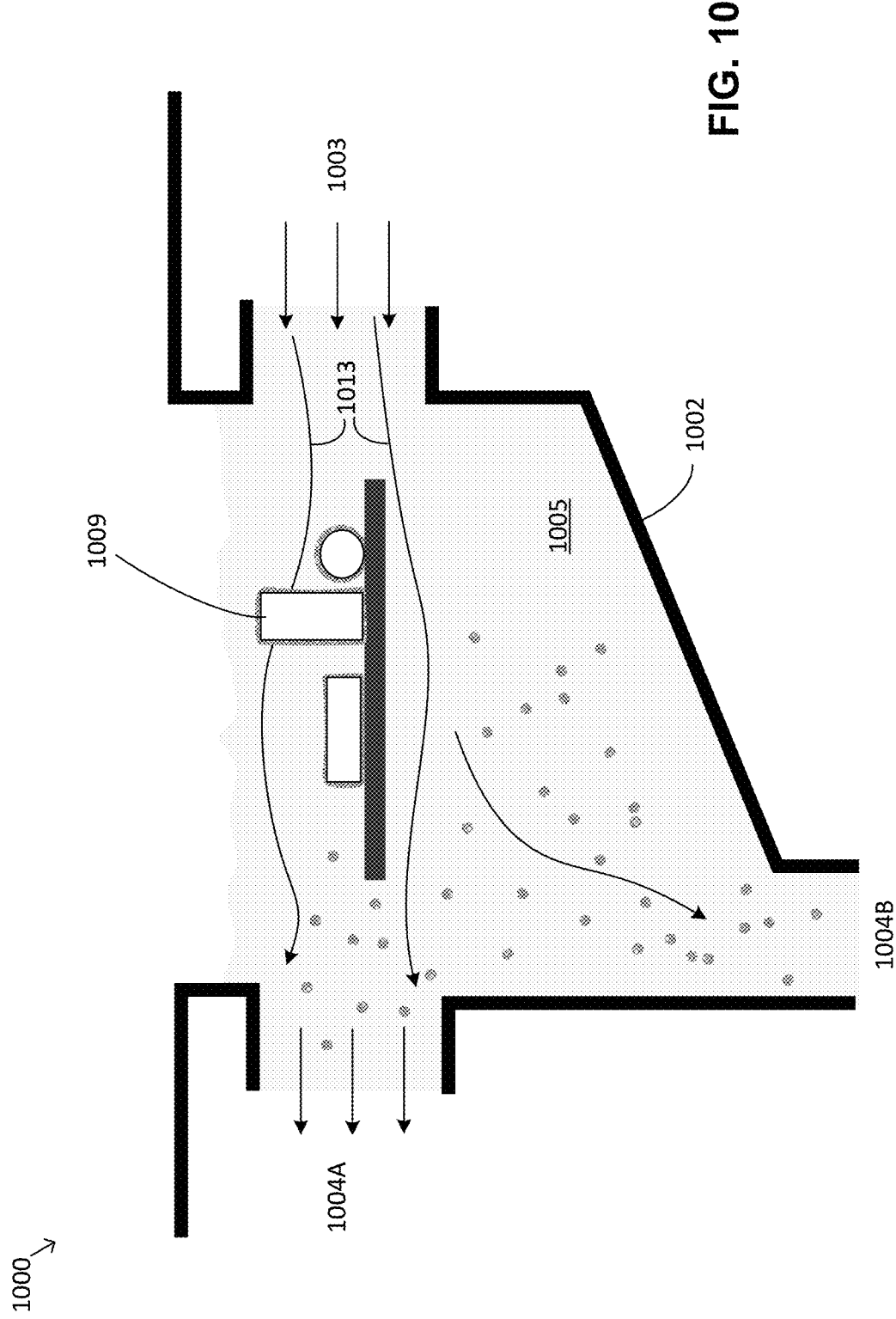
FIG. 10 illustrates transverse fluid flow within a container, according to some embodiments.

FIG. 10 illustrates transverse fluid flow within a container, according to some embodiments. Depowdering system 1000 comprises a container 1002 holding fluid 1005. The container 1002 includes an inlet 1003 and two outlets 1004A and 1004B. The depowdering system 1000 also includes at least one source of agitation (not shown in FIG. 10) such that fluid currents 1013 are generated through the inlet 1003 and into the container 1002. As shown in FIG. 10, transverse fluid currents 1013 may be produced in the fluid 1005 by said at least one source of agitation. Moreover, powder removed from the parts 1009 may be drawn to outlet 1004A due to the fluid currents and/or may be drawn to outlet 1004B under gravity.

Figure 11A:
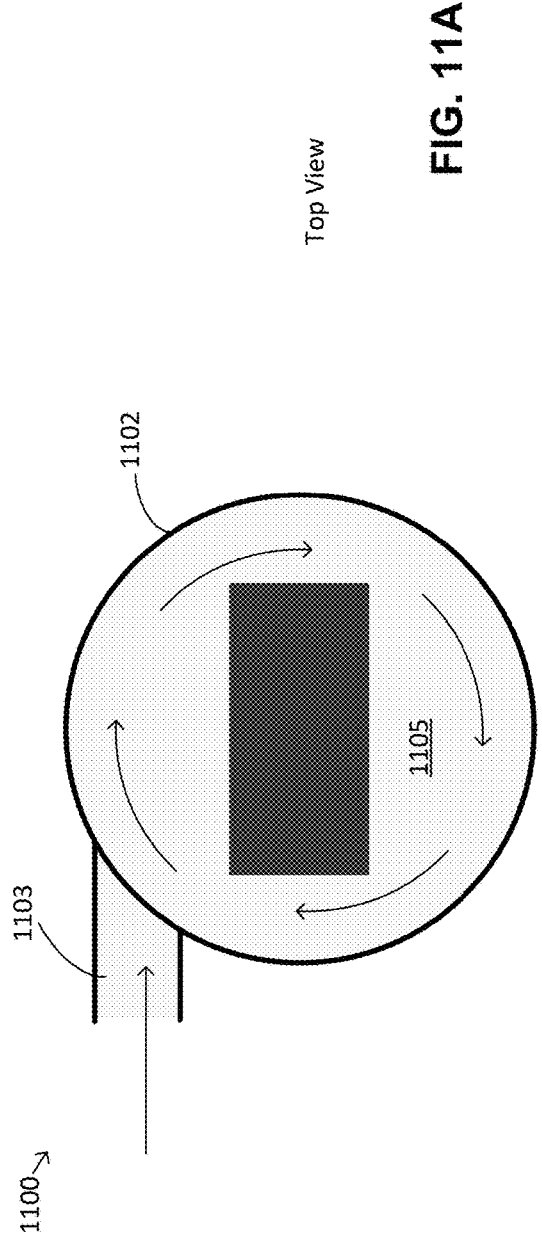
FIGS. 11A-11B illustrate top and side views, respectively, of circular fluid flow within a container, according to some embodiments.
Figure 11B:
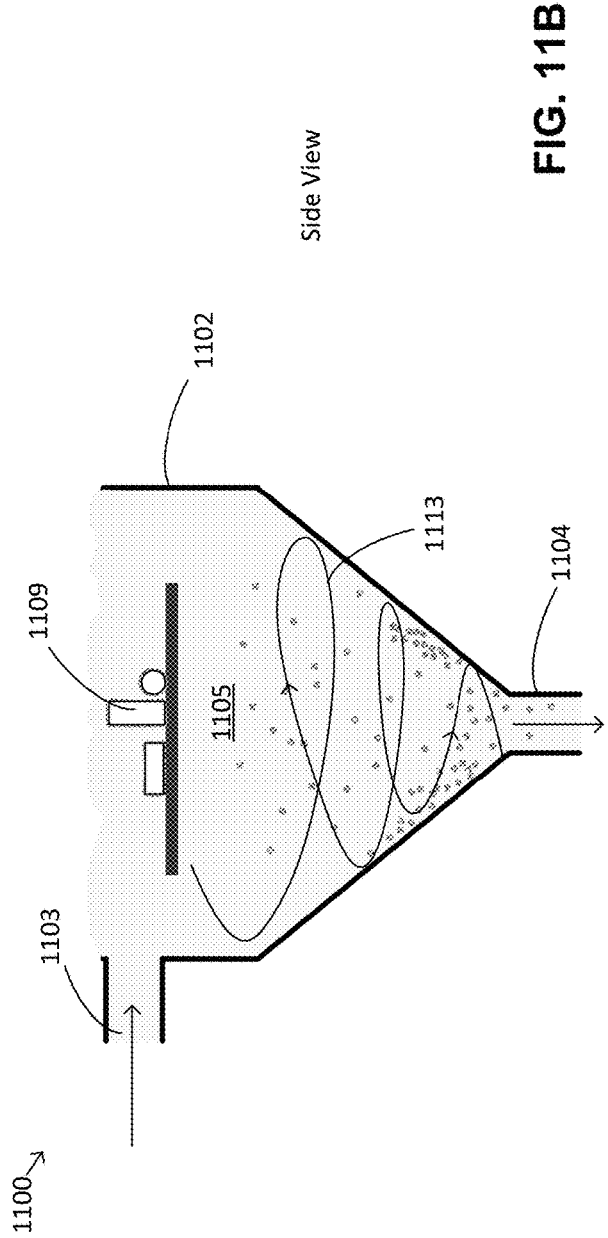

FIGS. 11A-11B illustrate top and side views, respectively, of circular fluid flow within a container, according to some embodiments. Depowdering system 1100 comprises a container 1102 holding fluid 1105. The container 1102 includes an inlet 1103 and outlet 1104 and is shaped with a circular cross section in an upper portion proximate to inlet 1103 and shaped with a conical cross section in a lower portion proximate to outlet 1104. The depowdering system 1100 also includes at least one source of agitation (not shown in FIGS. 11A-11B) such that fluid currents are generated through the inlet 1103 and into the container 1102. As a result of the circular shape of the upper portion of the container 1002 and the orientation of inlet 1103 at a tangent to said circular shape, circular fluid currents 1113 may be produced within the fluid 1105 held by the container. These fluid currents may remove powder from the parts 1109 and direct the powder downward to the outlet 1104 as shown.

Figure 12A:
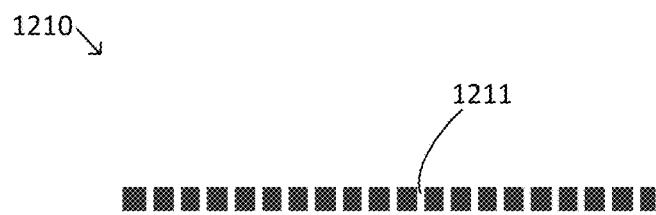
FIGS. 12A-12D depict cross-sectional views of holders suitable for holding additively fabricated parts during liquid immersion depowdering, according to some embodiments.
Figure 12B:
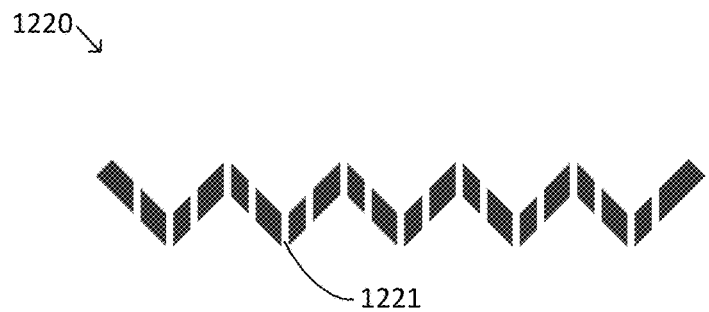

FIGS. 12A-12D depict cross-sectional views of holders suitable for holding additively fabricated parts during liquid immersion depowdering, according to some embodiments. Holder 1210 shown in FIG. 12A is an example of a flat tray holder that includes a plurality of perforations 1211 therethrough. Holder 1220 shown in FIG. 12B depicts a holder with a corrugated cross-sectional shape and a plurality of perforations 1221 therethrough. Note that the perforations in the example of FIG. 12B are arranged so that perforations are arranged at the bottom of the grooves of the corrugated shape. Other arrangements of perforations may also be suitable.

Figure 12C:
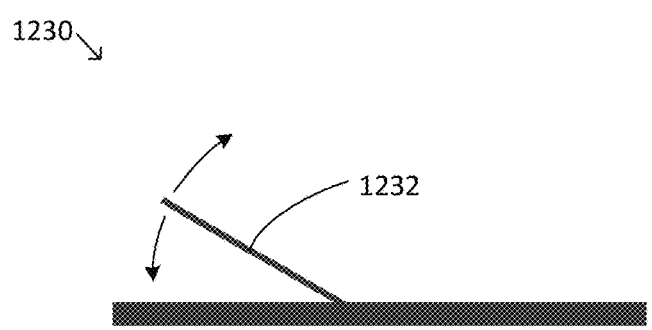
Figure 12D:
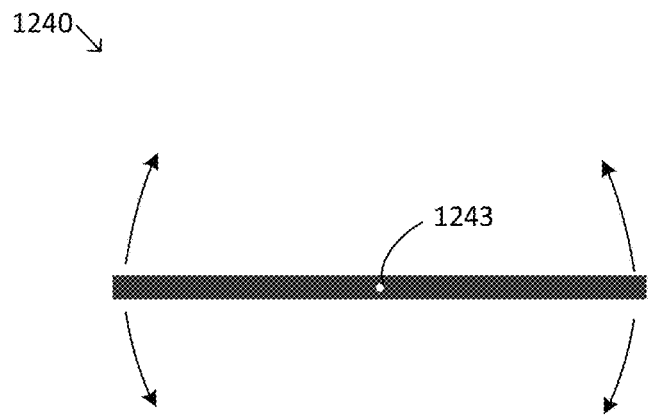

Holder 1230 shown in FIG. 12C is an example of a holder that includes a rotatable portion 1232. The rotatable portion 1232 may be operable by a depowdering system comprising holder 1230 to reorient parts arranged on the holder 1230. Holder 1240 shown in FIG. 12D is an example of a holder that may be tilted to reorient parts arranged on the holder 1240. The holder 1240 may be operable by a depowdering system comprising holder 1240 to rotate about axis 1243 and to thereby move parts arranged on the holder.

Figure 13:
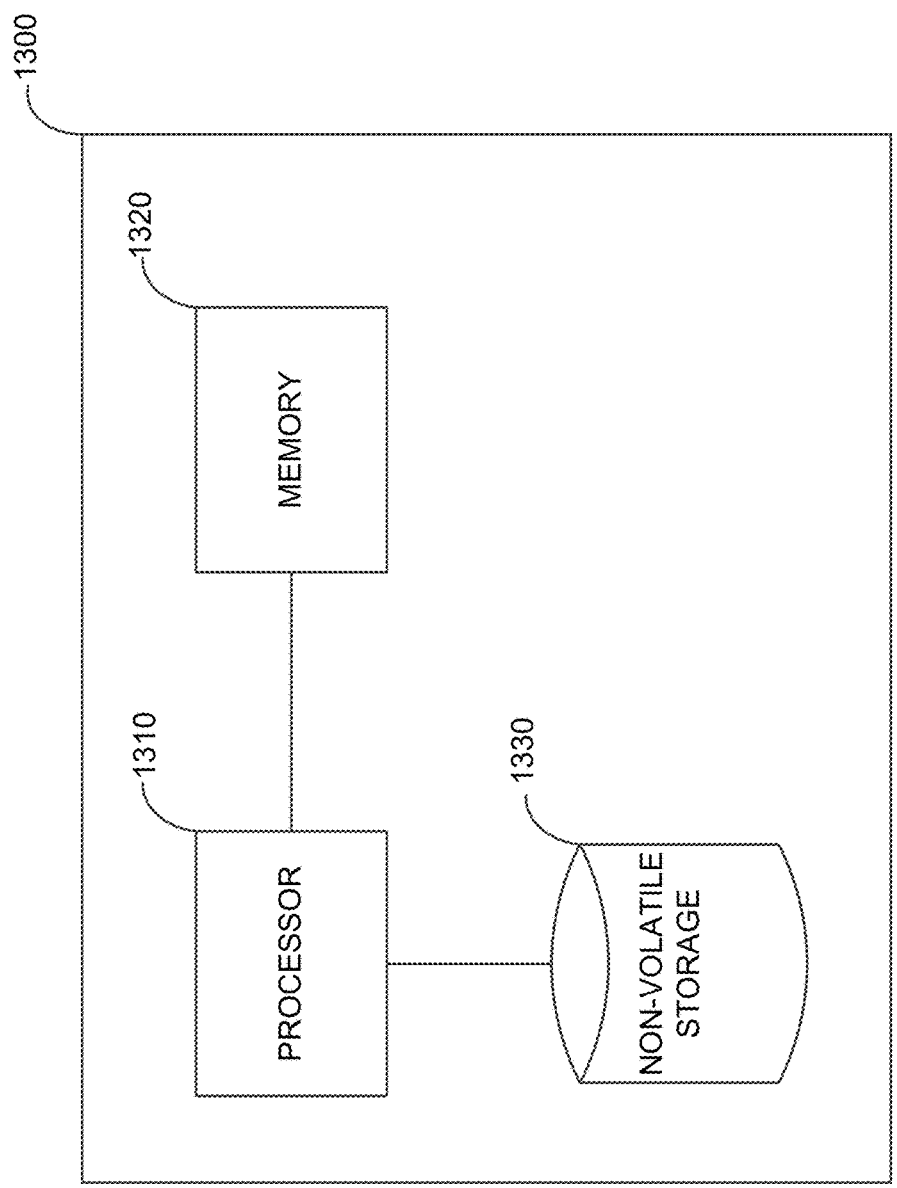
FIG. 13 illustrates an example of a computing system environment on which aspects of the invention may be implemented.

An illustrative implementation of a computer system 1300 that may be used to perform any of the techniques described above is shown in FIG. 13. The computer system 1300 may include one or more processors 1310 and one or more non-transitory computer-readable storage media (e.g., memory 1320 and one or more non-volatile storage media 1330). The processor 1310 may control writing data to and reading data from the memory 1320 and the non-volatile storage device 1330 in any suitable manner, as the aspects of the invention described herein are not limited in this respect. To perform functionality and/or techniques described herein, the processor 1310 may execute one or more instructions stored in one or more computer-readable storage media (e.g., the memory 1320, storage media, etc.), which may serve as non-transitory computer-readable storage media storing instructions for execution by the processor 1310.

In connection with techniques described herein, code used to, for example, generate instructions that, when executed, cause an additive fabrication device to fabricate one or more parts, cause a depowdering system to automatically perform depowdering operations (e.g., metering a powder bed, activating/deactivating a vibration source, etc.) may be stored on one or more computer-readable storage media of computer system 1300. Processor 1310 may execute any such code to perform any of the above-described techniques as described herein. Any other software, programs or instructions described herein may also be stored and executed by computer system 1300. It will be appreciated that computer code may be applied to any aspects of methods and techniques described herein. For example, computer code may be applied to interact with an operating system to transmit instructions to an additive fabrication device or depowdering system through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The above-described techniques may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within 20% of one another in some embodiments, within 10% of one another in some embodiments, within 5% of one another in some embodiments, and yet within 2% of one another in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of depowdering additively fabricated parts, the method comprising:

arranging a plurality of additively fabricated parts within a container containing a liquid and above an upper surface of the liquid in the container, the container coupled to at least one inlet through which the liquid flows into the container, and the container coupled to at least one outlet through which the liquid flows out of the container, wherein each of the plurality of additively fabricated parts is formed from particles of a metal powder held together by one or more binders, and has unbound particles of the metal powder on its surface;

generating, using at least one source of agitation, currents within the liquid in the container, wherein generating the currents comprises directing liquid from outside of the container onto the plurality of additively fabricated parts such that the directed liquid is deposited into the container while conveying unbound particles of the metal powder into the container;

conveying, by the generated liquid currents, at least some of the unbound particles of the metal powder away from the plurality of additively fabricated parts; and filtering, using a filtration device coupled to the at least one outlet of the container, at least some of the conveyed unbound particles of the metal powder from the liquid that flows out of the container.

2. The method of claim 1, wherein the plurality of additively fabricated parts are arranged on a tray within the container.

3. The method of claim 2, wherein the tray comprises a plurality of perforations and wherein conveying the unbound particles of the metal powder away from the plurality of additively fabricated parts comprises conveying at least a portion of the unbound particles of the metal powder through perforations of the plurality of perforations.

4. The method of claim 2, wherein an upper surface of the tray is corrugated.

5. The method of claim 1, wherein the liquid comprises one or more surfactants.

6. The method of claim 1, wherein the liquid comprises isopropyl alcohol and/or toluene.

* * * * *